United States Patent
Umehara

(10) Patent No.: US 11,226,191 B2
(45) Date of Patent: Jan. 18, 2022

(54) FILM THICKNESS MEASUREMENT DEVICE AND CORRECTION METHOD

(71) Applicant: Tokyo Electron Limited, Tokyo (JP)

(72) Inventor: Yasutoshi Umehara, Tokyo (JP)

(73) Assignee: Tokyo Electron Limited, Tokyo (JP)

(*) Notice: Subject to any disclaimer, the term of this patent is extended or adjusted under 35 U.S.C. 154(b) by 0 days.

(21) Appl. No.: 17/253,752

(22) PCT Filed: Jun. 18, 2019

(86) PCT No.: PCT/JP2019/024088
§ 371 (c)(1),
(2) Date: Dec. 18, 2020

(87) PCT Pub. No.: WO2020/004142
PCT Pub. Date: Jan. 2, 2020

(65) Prior Publication Data
US 2021/0270597 A1    Sep. 2, 2021

(30) Foreign Application Priority Data
Jun. 27, 2018   (JP) .............................. JP2018-122148

(51) Int. Cl.
*G01B 11/06* (2006.01)
*G01N 21/47* (2006.01)

(52) U.S. Cl.
CPC ......... *G01B 11/06* (2013.01); *G01N 21/4738* (2013.01)

(58) Field of Classification Search
CPC ..................... G01B 11/06; G01N 21/4738
See application file for complete search history.

(56) References Cited

FOREIGN PATENT DOCUMENTS

| JP | 2003-042722 | 2/2003 | |
|----|-------------|--------|------|
| JP | 2004-205242 | 7/2004 | |
| JP | 2004205242 A | * 7/2004 | ............ G01B 11/06 |
| JP | 2005-032740 | 2/2005 | |
| JP | 2009-192331 | 8/2009 | |

* cited by examiner

*Primary Examiner* — Jamil Ahmed
(74) *Attorney, Agent, or Firm* — IPUSA, PLLC

(57) ABSTRACT

A film thickness measurement device according to one aspect of the present disclosure includes: a first computing unit configured to, for each location on a first wafer having a known thickness other than a reference location on the first wafer, calculate a relative reflectance of a reflection spectral signal of reflected light detected by a collection probe, with respect to a reference reflection spectral signal of reflected light detected by the collection probe at the reference location on the first wafer; a specifying unit configured to specify a relationship between the relative reflectance calculated by the first computing unit and distance data representing a distance between the location on the first wafer and the collection probe; a second computing unit configured to calculate relative reflectances each corresponding to distance data representing a distance between the collection probe and a corresponding location on a second wafer to be measured, based on the relationship specified by the specifying unit; and a correction unit configured to, in calculating film thickness at each location on the second wafer, correct the reference reflection spectral signal based on the relative reflectances calculated by the second computing unit.

7 Claims, 9 Drawing Sheets

| D2 | |
|---|---|
| MEASURE-MENT POINT | BARE Si DISTANCE DATA (G) |
| P1 | * * * |
| P2 | * * * |
| P3 | * * * |
| P4 | * * * |
| ⋮ | ⋮ |
| P49 | * * * |

FILM THICKNESS MEASUREMENT DEVICE AND CORRECTION METHOD

TECHNICAL FIELD

The present disclosure relates to a film thickness measurement device and a correction method.

BACKGROUND

Various devices have been proposed for measuring film thickness of wafers. For example, the following patent documents each disclose a film thickness measurement device that measures film thickness of a wafer by emitting visible light on the surface of the wafer and by using reflection spectral signal of the reflected light detected by a collection probe.

In such a film thickness measurement device, the film thickness of a wafer to be measured is calculated by comparing with a reference reflection spectral signal obtained from a reference wafer (e.g., bare Si wafer) whose film thickness is already known, and the film thickness is calculated for the wafer to be measured, which is based on the assumption that the wafer to be measured is not deformed.

RELATED ART DOCUMENTS

Patent Documents

[Patent Document 1] Japanese Laid-open Patent Application Publication No. 2003-42722
[Patent Document 2] Japanese Laid-open Patent Application Publication No. 2009-192331

SUMMARY

Problem to be Solved by the Invention

The present disclosure provides a film thickness measurement device and a correction method capable of calculating the film thickness even when the wafer to be measured is deformed.

Means for Solving Problem

A film thickness measurement device according to one aspect of the present disclosure includes, for example, the following configuration. That is, the film thickness measurement device includes: a first computing unit configured to calculate relative reflectances of respective reflection spectral signals of reflected light detected, by a collection probe, at respective locations on a first wafer having a known thickness other than a reference location on the first wafer, with respect to a reference reflection spectral signal of reflected light detected by the collection probe at the reference location on the first wafer; a specifying unit configured to specify a relationship between the relative reflectances calculated by the first computing unit and distance data representing distances between the respective locations on the first wafer and the collection probe; a second computing unit configured to calculate relative reflectances each corresponding to distance data representing a distance between the collection probe and a corresponding location on a second wafer to be measured, based on the relationship specified by the specifying unit; and a correction unit configured to, in calculating film thickness at each location on the second wafer, correct the reference reflection spectral signal based on the relative reflectances calculated by the second computing unit.

Effect of Invention

According to the present disclosure, it is possible to provide a film thickness measurement device and a correction method, which are capable of calculating the film thickness even if a wafer to be measured is deformed.

DESCRIPTION OF EMBODIMENTS

Figure 1:
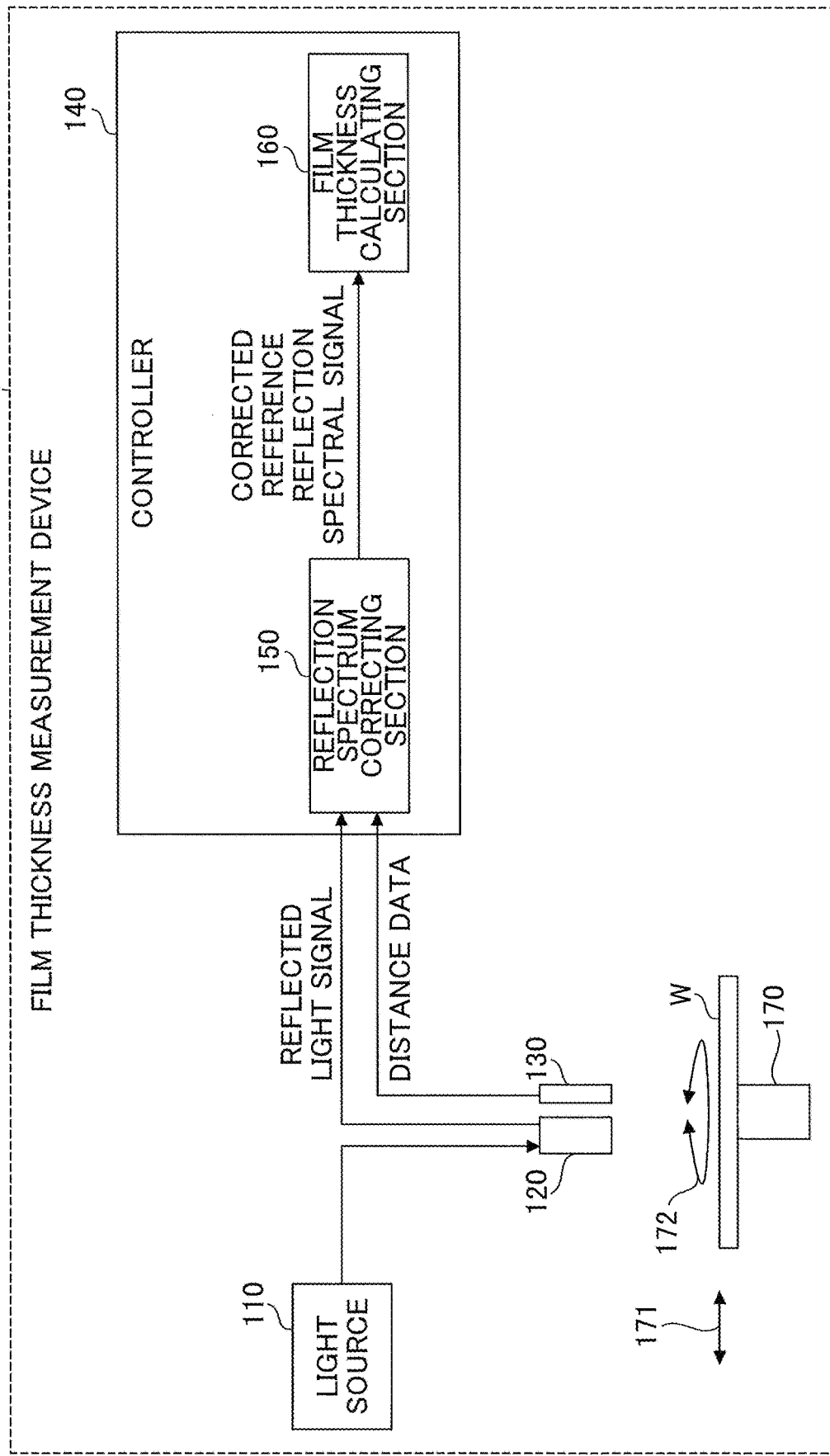
FIG. 1 is a schematic diagram illustrating the configurations of the film thickness measurement device.

First, definitions of terms used in each of the following embodiments will be described, and an outline of a film thickness measurement device according to the following embodiments will be described in comparison with a general film thickness measurement device.

In each of the following embodiments, a "wafer to be measured" (second wafer) refers to a wafer having unknown film thickness, and a "reference wafer" (first wafer) refers to a wafer, the thickness of which is already known.

Here, in a general film thickness measurement device, measurement is performed based on the assumption that, a wafer to be measured is not deformed, and a reference wafer that is not deformed is used for calibration. That is, a general film thickness measurement device assumes that each "distance data" representing the distance between a collection probe for detecting reflected light and each location on a wafer to be measured is equal, and is equal to "distance data" representing the distance between the collection probe and the reference wafer.

Under such assumption, difference in a reflection spectral signal between the wafer to be measured and the reference wafer depends on difference in film thickness. For this reason, in a general film thickness measurement device, the film thickness at each location on the wafer to be measured is calculated by comparing a reflection spectral signal at each location on the wafer to be measured ("reflection spectral signal of interest") with a reflection spectral signal of the reference wafer ("reference reflection spectral signal"). Here, in a general film thickness measurement device, for example, with respect to one point at the center of a reference wafer, a representative value is acquired. Also, the general film thickness measurement device assumes that the film thickness at the point is known.

However, in reality, wafers to be measured are deformed by a variety of factors, and the distance data varies for each location. Therefore, a difference in the reflection spectral signal between the wafer to be measured and the reference wafer includes not only a difference in film thickness but also a difference in the distance data. As a result, in a general film thickness measurement device, accuracy of measurement of the film thickness measurement decreases if the wafer to be measured is deformed.

Therefore, in order to appropriately calculate film thickness even in a case in which the wafer to be measured is deformed, the film thickness measurement device according to the following embodiments is configured to eliminate an effect on the reflection spectral signal due to variation in the distance data.

Specifically, in the film thickness measurement device according to the following embodiments, first, a deformed reference wafer is used for calibration (preferably, a reference wafer having a uniform film thickness is used). Then, by a linear equation, the film thickness measurement device according to the following embodiments approximates the relationship in which the reflection spectral signal varies as distance data varies between a particular location ("reference location") of the reference wafer and each location other than the reference location. The film thickness measurement device according to the following embodiments uses the "relative reflectance" between the reference reflection spectral signal at the reference location and a reflection spectral signal at each location other than the reference location, as a value representing variation of the reflection spectral signal.

Furthermore, the film thickness measurement device according to the following embodiments calculates the relative reflectance corresponding to distance data of each location on a wafer to be measured, based on the approximate linear equation, and corrects the reference reflection spectral signal used for calculating film thickness using the calculated relative reflectances. This calculates reference reflection spectral signals after correction ("corrected reference reflection spectral signals").

The film thickness measurement device according to the following embodiments calculates the film thickness at each location by comparing the reflection spectral signal at each location on the wafer to be measured ("reflection spectral signal of interest") with the corrected reference reflection spectral signal corresponding to the distance data at each location on the wafer to be measured.

Thus, according to the film thickness measurement device according to the following embodiments, even in a case in which a wafer to be measured is deformed, the film thickness can be calculated appropriately, and it is possible to avoid a decrease in the measurement accuracy of the film thickness measurement.

Hereinafter, details of each of the embodiments will be described with reference to the accompanying drawings. In the present specification and the drawings, the same reference symbols are given to elements having substantially identical functional configuration and overlapping descriptions may be omitted.

First Embodiment

Configuration of the Film Thickness Measurement Device

FIG. 1 is a schematic diagram illustrating the configurations of the film thickness measurement device, which illustrates part of the configurations of the film thickness measurement device. As illustrated in FIG. 1, the film thickness measurement device 100 includes at least a light source 110, a collection probe 120, a distance sensor 130, a controller 140, and a wafer chuck head 170.

The light source 110 emits visible light to the wafer W placed on the wafer chuck head 170 through a collection probe 120.

The collection probe 120 has an output portion that emits visible light and an input portion that receives reflected light reflected at the surface of the wafer W. The reflected light incident on the input portion is transmitted to the controller 140 as a reflected light signal.

The wafer chuck head 170 is controlled to reciprocate in the direction indicated by the arrow 171 while rotating in either direction indicated by the arrow 172. This allows the collection probe 120 to detect reflected light at each location on the wafer W.

The distance sensor 130 measures the distance between the collection probe 120 (e.g., the tip of the collection probe 120) and a desired point (i.e., location) on the wafer W, and outputs information of the measured distance (distance data). The distance data measured at each location on the wafer w is transmitted to the controller 140. The distance sensor 130 can measure the distance between the collection probe 120 and every location on the wafer W at which the reflected light is detected by the collection probe 120.

A reflection spectrum correction program and a film thickness calculation program are installed in the controller 140, and as the programs are executed, the controller 140 functions as the reflection spectrum correcting section 150 and the film thickness calculating section 160.

The reflection spectrum correcting section 150 performs different processes in a calibration phase and a measurement phase. The calibration phase is a phase in which the relationship in which the reflection spectral signal varies in accordance with variation in distance data is approximated by a linear equation, in consideration of the fact that the relationship between the reflection spectral signal and the film thickness is affected by variation in the distance data.

It should be noted that distance data of each location on a wafer W varies due to deformation of the wafer W. Specifically, in a case in which a film is formed on the wafer W, the distance data varies due to the "bending" of the wafer caused by film stress.

Also, distance data of each location on a wafer W varies due to hanging ("droop") of the outer periphery of the wafer W by its own weight, in a case in which the diameter of the wafer W is greater than the diameter of the wafer chuck head 170 as illustrated in FIG. 1.

As described above, if the distance data of a wafer W varies due to bending or drooping of the wafer W, the reflection spectral signal is affected. Therefore, this causes occurrence of an error when calculating the film thickness of the surface of the wafer W. Thus, in the calibration phase, by using a reference wafer having bending or drooping, a film thickness of which is already known the relationship in which the reflection spectral signal varies with the variation of the distance data is approximated in advance by a linear equation A specific example of the reference wafer used in the present embodiment includes a mirror plate for high-reflection made of mirrored quartz glass. Alternatively, examples of the reference wafer may include a wafer made by forming a native oxide film (of approximately 10 nm thickness) on bare Si, or a wafer made by forming an $Al_2O_3$ film (of approximately 30 nm thickness) on bare Si (hereinafter referred to as a bare Si wafer).

Meanwhile, the measurement phase is a phase in which the corrected reference reflection spectral signal at each location on a wafer W (wafer to be measured) is calculated by inputting the distance data of each of the locations on the wafer to be measured to the above-described linear equation and by calculating relative reflectance in accordance with the distance data of each of the locations on the wafer to be measured, thereby. The reflection spectrum correcting section 150 notifies the film thickness calculating section 160 of the calculated corrected reference reflection spectral signal or a result of a comparison between the reflection spectral signal of interest and the corrected reference reflection spectral signal.

That is, the corrected reference reflection spectral signal used in the present embodiment refers to a reference reflection spectral signal in which variation in reflectance caused by variation in distance data relative to the reference location is corrected, in view of the variation in the distance data of a current location in the reference wafer relative to the reference location.

The reflection spectral signal of interest refers to a reflection spectral signal at the current location in a wafer to be measured.

The film thickness calculating section 160 computes the film thickness at each location on a wafer W (wafer to be measured) by using the corrected reference reflection spectral signal corresponding to the distance data of each of the locations on the wafer W (wafer to be measured) that is notified by the reflection spectrum correcting section 150. Alternatively, the film thickness calculating section 160 calculates the film thickness at each of the locations on the wafer W (wafer to be measured) using the result of comparison at each of the locations on the wafer W (wafer to be measured) notified by the reflection spectrum correcting section 150.

As described above, in the film thickness measurement device 100 according to the first embodiment, the reference reflection spectral signal is corrected according to the variation in the distance data of each location on the wafer W. Accordingly, the reflection spectrum correcting section 150 can calculate the corrected reference reflection spectral signal in which influence of the variation in the distance data is eliminated.

As a result, in the film thickness measurement device 100 according to the first embodiment, even in a case in which a wafer to be measured is deformed, the film thickness can be calculated appropriately by using the corrected reference reflection spectral signal, and thus it is possible to avoid a decrease in the measurement accuracy of the film thickness measurement.

Hardware Configuration of Controller

Figure 2:
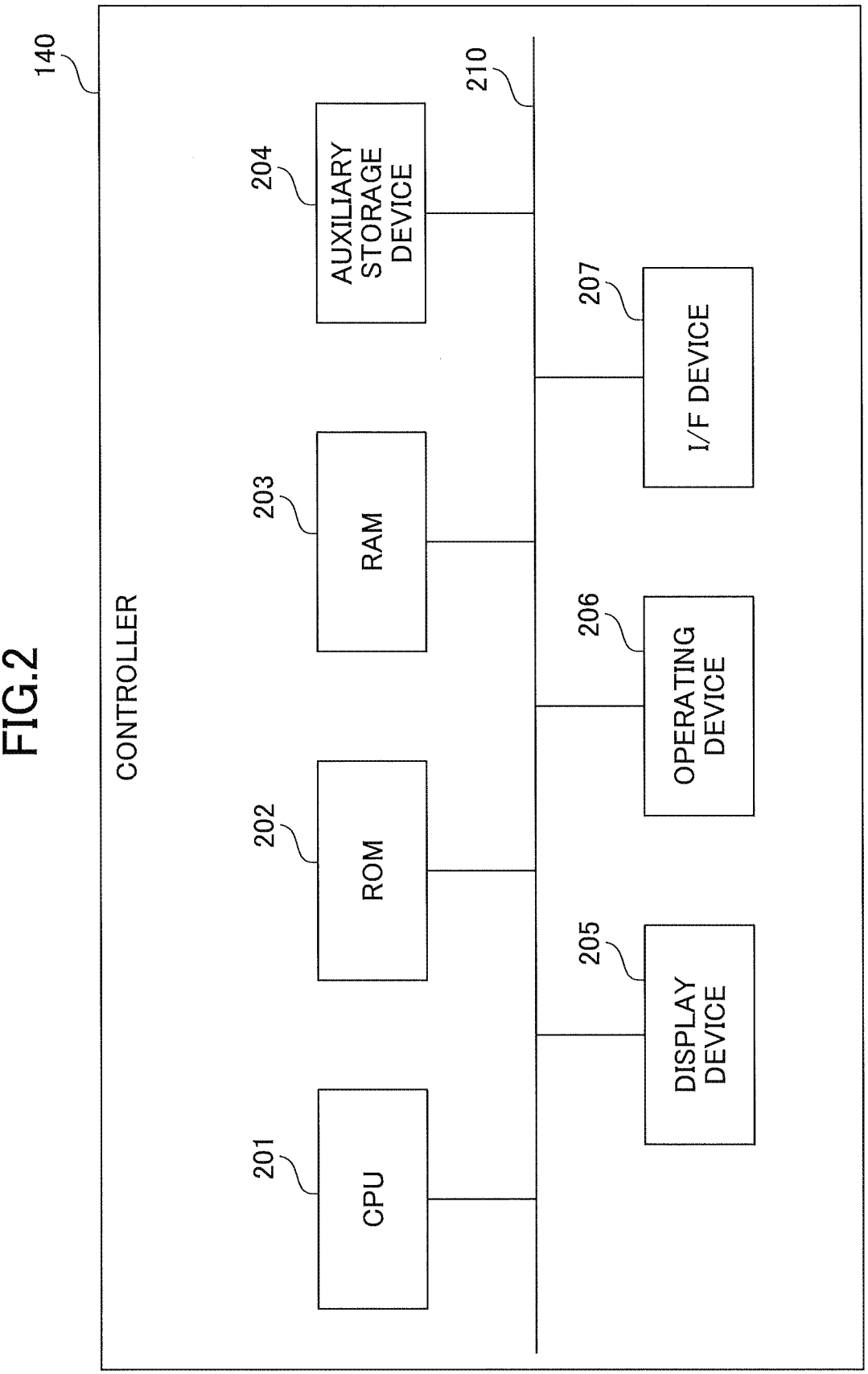
FIG. 2 is a diagram illustrating an example of the hardware configuration of a controller of the film thickness measurement device.

Next, the hardware configuration of the controller 140 will be described. FIG. 2 is a diagram illustrating an example of the hardware configuration of the controller. As illustrated in FIG. 2, the controller 140 includes a CPU (Central Processing Unit) 201, a ROM (Read Only Memory) 202, and a RAM (Random Access Memory) 203. The CPU 201, the ROM 202, and the RAM 203 form a so-called computer.

The controller 140 also includes an auxiliary storage device 204, a display device 205, an operating device 206, and an I/F (interface) device 207. Each of the hardware components of the controller 140 is interconnected via a bus 210.

The CPU 201 is an arithmetic operation device that executes various programs (e.g., a reflection spectrum correction program, a film thickness calculation program, and the like) installed in the auxiliary storage device 204.

The ROM 202 is a non-volatile memory. The ROM 202 functions as a main storage device that stores programs and data required for the CPU 201 executing the various programs installed in the auxiliary storage device 204. Specifically, the ROM 202 functions as the main storage device for storing boot programs such as BIOS (Basic Input/Output System) and EFI (Extensible Firmware Interface).

The RAM 203 is a volatile memory such as a DRAM (Dynamic Random Access Memory) or an SRAM (Static Random Access Memory). The RAM 203 functions as a main storage device that provides a work area on which the various programs installed in the auxiliary storage device 204 are loaded when the various programs are executed by the CPU 201.

The auxiliary storage device 204 is an auxiliary storage device that stores the various programs and stores information generated when the various programs are executed.

The display device 205 is a display device that displays an internal state of the controller 140. The operating device 206 is an input device for an operator of the film thickness measurement device 100 to input various instructions to the film thickness measurement device 100.

The I/F device 207 is a connection device that connects each device in the film thickness measurement device 100 and communicates with each of the devices.

Functional Configuration of Reflection Spectrum Correcting Section

Next, the functional configuration of the reflection spectrum correcting section 150, which is realized by executing the reflection spectrum correction program, will be described in detail.

Figure 3:
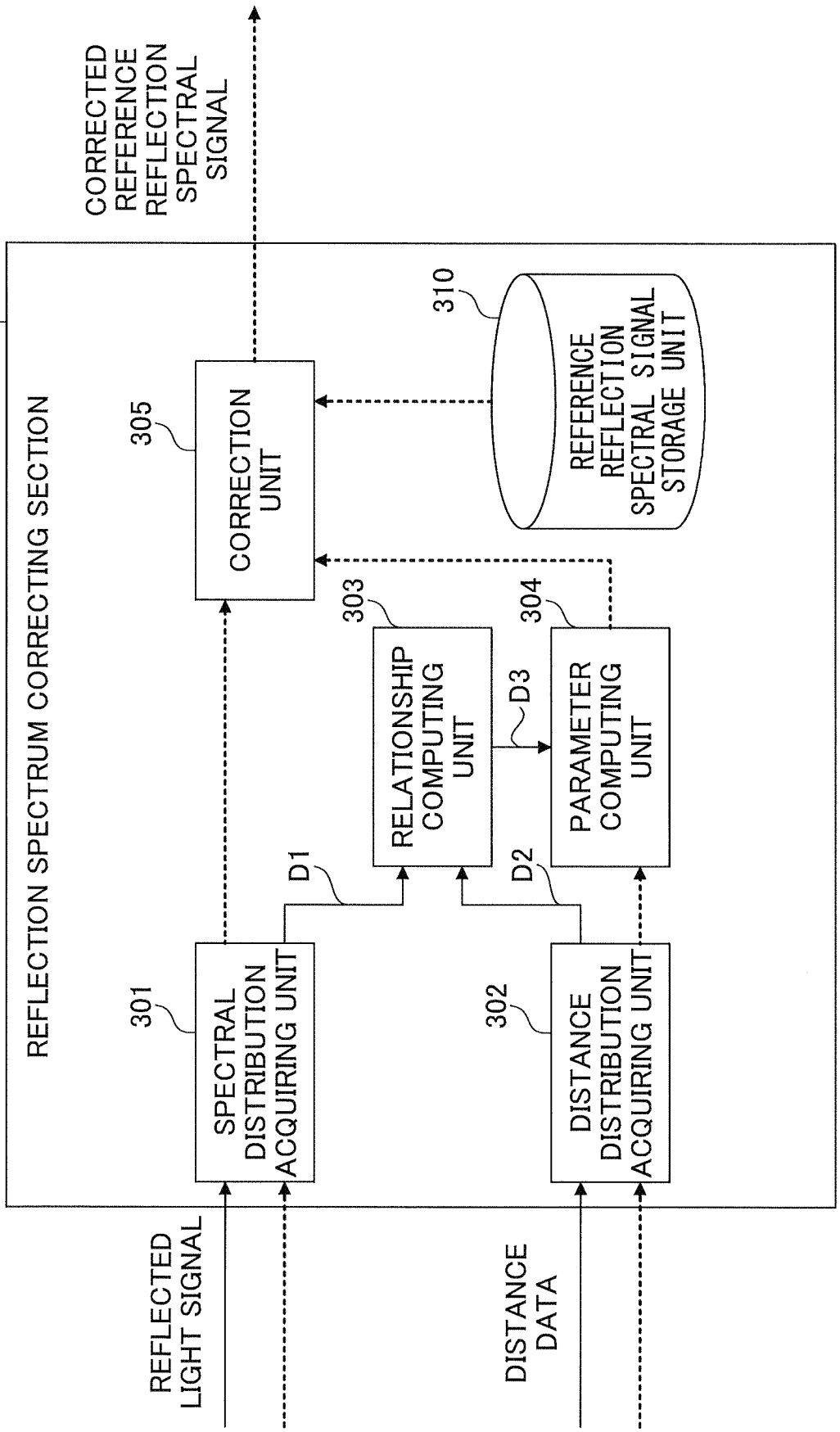
FIG. 3 is a diagram illustrating an example of the functional, configuration of a reflection spectrum correcting section.

FIG. 3 is a diagram illustrating an example of the functional configuration of a reflection spectrum correcting section. As illustrated in FIG. 3, the reflection spectrum correcting section 150 includes a spectral distribution acquiring unit 301, a distance distribution acquiring unit 302, a relationship computing unit 303, a parameter computing unit 304, and a correction unit 305. In FIG. 3, solid arrows indicate data flow during the calibration phase, and dashed arrows indicate data flow during the measurement phase.

The spectral distribution acquiring unit 301 is an example of a first computing unit. During the calibration phase, the spectral distribution acquiring unit 301 acquires a reflected light signal at each location on a wafer W (reference wafer (bare Si wafer) in the calibration phase) detected by the collection probe 120.

The spectral distribution acquiring unit 301 also generates reflection spectral signals based on reflected optical signals at respective locations. The spectral distribution acquiring unit 301 stores, among the reflection spectral signals, a reflection spectral signal at the reference location (the center of the wafer W) into the reference reflection spectral signal storage unit 310, as the reference reflection spectral signal.

Also, the spectral distribution acquiring unit 301 extracts a peak value from the reflection spectral signal at each of the locations, and calculates a relative value (relative reflectance (K)) to the peak value extracted from the reference reflection spectral signal. The spectral distribution acquiring unit 301 notifies the relationship computing unit 303 of the relative reflectance (K) at each of the locations, as "data D1".

Further, in the measurement phase, the spectral distribution acquiring unit 301 acquires a reflected optical signal at each location on a wafer W (wafer to be measured in the measurement phase) detected by the collection probe 120. The spectral distribution acquiring unit 301 generates reflection spectral signals of interest based on the reflected optical signals at the respective locations, and notifies the correction unit 305 of the reflection spectral signals of interest.

During the calibration phase, the distance distribution acquiring unit 302 acquires distance data (G) representing a distance between each location on a wafer W (reference wafer (bare Si wafer)) at the time of detecting reflected light and the collection probe 120, which is transmitted from the distance sensor 130. The distance distribution acquiring unit 302 also notifies the relationship computing unit 303 of the distance data (G) of each location on the wafer W (the reference wafer (bare Si wafer)) as "data D2".

In the measurement phase, the distance distribution acquiring unit 302 acquires distance data (G) representing a distance between each location on a wafer W (wafer to be measured) at the time of detecting reflected light and the collection probe 120, which is transmitted from the distance sensor 130. The distance distribution acquiring unit 302 notifies the parameter computing unit 304 of the distance data (G) of each location on the wafer W (wafer to be measured).

The relationship computing unit 303 is an example of a specifying unit. In the calibration phase, the relationship computing unit 303 calculates a relationship expression representing the relationship between the distance data (G) of the reference wafer (bare Si wafer) and the relative reflectance (K), based on the data D1 and the data D2. The relationship computing unit 303 notifies the parameter computing unit 304 of the calculated relationship expression representing the relationship between the distance data (G) and the relative reflectance (K) as "data D3".

The parameter computing unit 304 is an example of a second computing unit. The parameter computing unit 304 retains the data D3 notified by the relationship computing unit 303 during the calibration phase. In the measurement phase, the parameter computing unit 304 calculates relative reflectance (K) corresponding to the distance data (G) of each location on a wafer W (wafer to be measured) notified by the distance distribution acquiring unit 302, by using the retained data D3.

The parameter computing unit 304 also notifies the correction unit 305 of the calculated relative reflectance (K).

In the measurement phase, the correction unit 305 reads out the reference reflection spectral signal from the reference reflection spectral signal storage unit 310, and corrects the reference reflection spectral signal that is read out, by using the relative reflectance (K) corresponding to the distance data of each location on a wafer W (wafer to be measured). This produces a corrected reference reflection spectral signal at each location on the wafer (wafer to be measured). The correction unit 305 notifies the film thickness calculating section 160 of the corrected reference reflection spectral signal. Alternatively, the correction unit 305 compares the reflection spectral signal of interest at each location on the wafer W (wafer to be measured) with the corrected reference reflection spectral signal corresponding to the distance data of each location or the wafer W (wafer to be measured), and notifies the film thickness calculating section 160 of the comparison result.

Flow of Reflection Spectrum Correction

Figure 4:
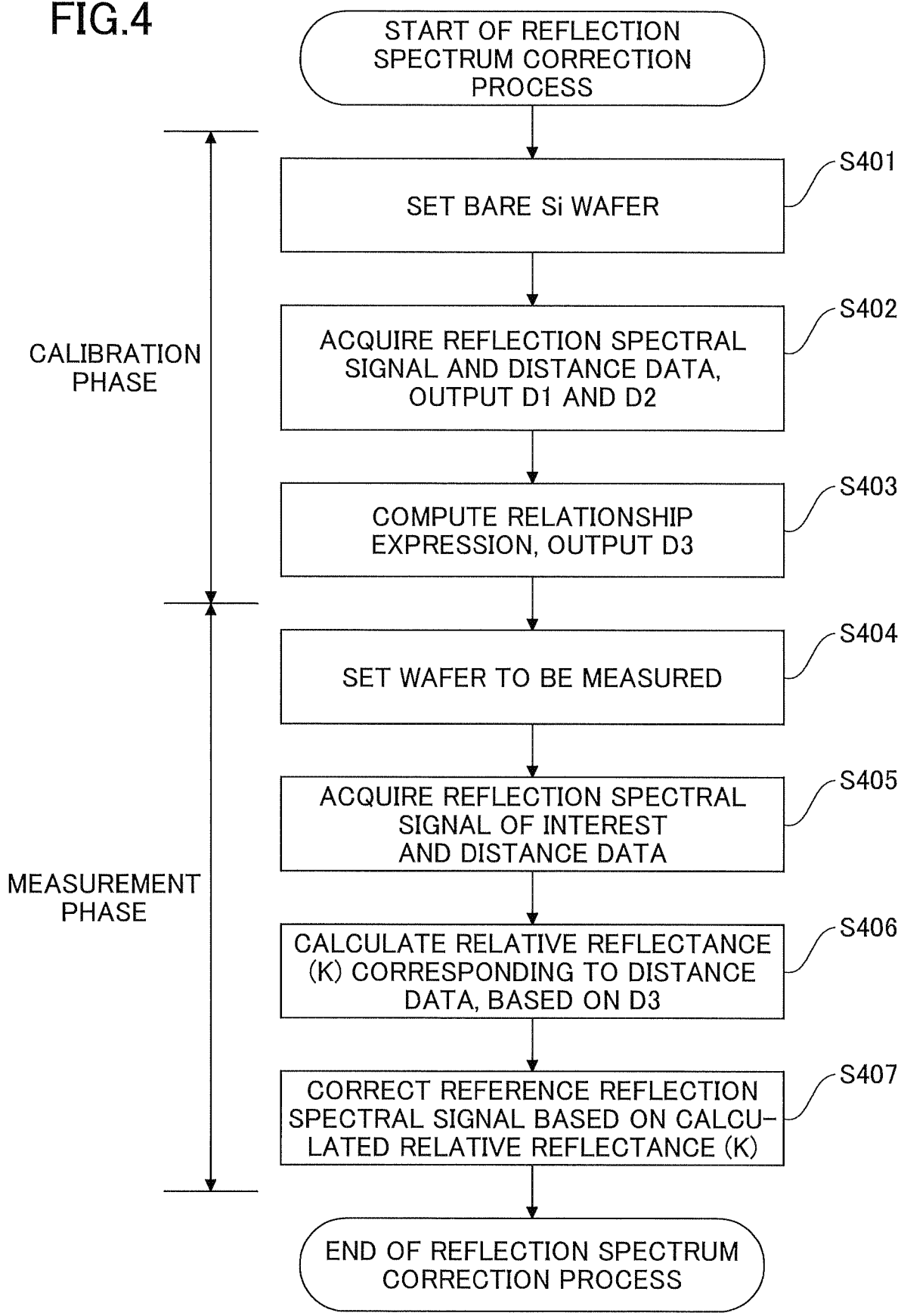
FIG. 4 is a flowchart illustrating a flow of a reflection spectrum correction process performed by the reflection spectrum correcting section.

Next, the flow of a reflection spectrum correction process performed by the reflection spectrum correcting section 150 will be described. FIG. 4 is a flowchart illustrating the flow of the reflection spectrum correction process performed by the reflection spectrum correcting section. When starting the reflection spectrum correction process illustrated in FIG. 4, calculation of a correction coefficient (Rk) of the absolute reflectance is completed in the reflection spectrum correcting section 150. The correction coefficient (Rk) of the absolute reflectance is based on absolute spectral data obtained by, for example, using a standard sample of quartz glass, which is issued by NIST (National Institute of Standards and Technology).

In step S401, an operator of the film thickness measurement device 100 sets the wafer W (reference wafer (bare Si wafer)) to the wafer chuck head 170.

In step S402, the film thickness measurement device 100 causes the wafer chuck head 170 to reciprocate in the direction of the arrow 171 while rotating the wafer chuck head 170 in either direction of the arrow 172. At this point, the collection probe 120 detects reflected light at each location on the reference wafer (bare Si wafer). Further, the spectral distribution acquiring unit 301 calculates the relative reflectance (K) based on the peak value of the reflection spectral signal at each location on the reference wafer (bare Si wafer), and outputs the relative reflectance (K) as data D1.

For each of the locations on the reference wafer (bare Si wafer), the distance sensor 130 measures distance to the collection probe 120, and outputs distance data to the controller 140 (reflection spectrum correcting section 150). The distance distribution acquiring unit 302 of the reflection spectrum correcting section 150 outputs distance data (G) of each of the locations as data D2.

In step S403, the relationship computing unit 303 computes the relationship expression representing the relationship between the distance data (G) and the relative reflectance (K), and notifies the parameter computing unit 304 of the calculated relationship expression as data D3. Steps S401 through S403 described above are performed in the calibration phase.

Subsequently, in step S404, an operator of the film thickness measurement device 100 sets a wafer to be measured to the wafer chuck head 170.

In step S405, the film thickness measurement device 100 causes the wafer chuck head 170 to reciprocate in the direction of the arrow 171 while rotating the wafer chuck head 170 in either direction of the arrow 172. At this time, the collection probe 120 detects reflected light at each location on the wafer to be measured. Also, for each of the locations on the wafer to be measured, the spectral distribution acquiring unit 301 notifies the correction unit 305 of the reflection spectral signal of interest.

Further, the distance sensor 130 measures the distance between the wafer to be measured and the collection probe 120 for each of the locations of the wafer, and outputs the distance data to the controller 140 (the reflection spectrum correcting section 150). The distance distribution acquiring unit 302 of the reflection spectrum correcting section 150 notifies the parameter computing unit 304 of the distance data (G) of each of the locations.

In step S406, the parameter computing unit 304 calculates the relative reflectance (K) corresponding to the distance data of each of the locations on the wafer to be measured notified by the distance distribution acquiring unit 302, by using the data D3 notified by the relationship computing unit 303 in the calibration phase. The parameter computing unit 304 notifies the correction unit 305 of the relative reflectance (K) at each of the locations.

In step S407, the correction unit 305 corrects the reference reflection spectral signal by using the relative reflectance (K) corresponding to the distance data of each of the locations on the wafer to be measured, which is notified by the spectral distribution acquiring unit 301. The correction unit 305 notifies the film thickness calculating section 160 of the corrected reference reflection spectral signal. Steps S404 through S407 described above are performed in the measurement phase.

It should be noted that detection of reflected light by the collection probe 120 and measurement of distance by the distance sensor 130, which are performed in step S402 and step S405, may be performed in parallel. Specifically, when the collection probe 120 detects reflected light reflected from a certain point (location) on the wafer, the distance sensor 130 simultaneously measures the distance between the point (location) and the collection probe 120 and outputs distance data of the measured distance. However, the detection of reflected light by the collection probe 120 and the measurement of distance by the distance sensor 130 need not necessarily be performed completely simultaneously. For example, after the collection probe 120 detects reflected light reflected from a first point (first location) on the wafer and while the collection probe 120 is detecting reflected light reflected from a second point (second location) on the wafer, the distance sensor 130 may measure the distance between the first point and the collection probe 120.

Alternatively, detection of reflected light by the collection probe 120 and measurement of distance by the distance sensor 130 may each be performed in different periods of time. For example, after the collection probe 120 performs, for multiple points (locations) on the wafer, processing to detect reflected light reflected from respective points (locations), the distance sensor 130 may measure the distance between the collection probe 120 and the respective multiple points (locations). However, it is preferable that the measurement of distance by the distance sensor 130 and the detection of reflected light by the collection probe 120 are performed in parallel, because the processing time of the reflection spectrum correction process can be shortened by performing the measurement of distance and the detection of reflected light simultaneously.

Further, processing performed by the spectral distribution acquiring unit 301 and processing performed by the distance distribution acquiring unit 302 may be performed in parallel. However, these two processings may be performed in different periods of time.

Example of Processing of Each Part of the Reflection Spectrum Correcting Section in Calibration Phase Next, a specific example of processing of each part of the reflection spectrum correcting section 150 (the spectral distribution acquiring unit 301, the distance distribution acquiring unit 302, and the relationship computing unit 303) in the calibration phase will be described.

Figure 5:
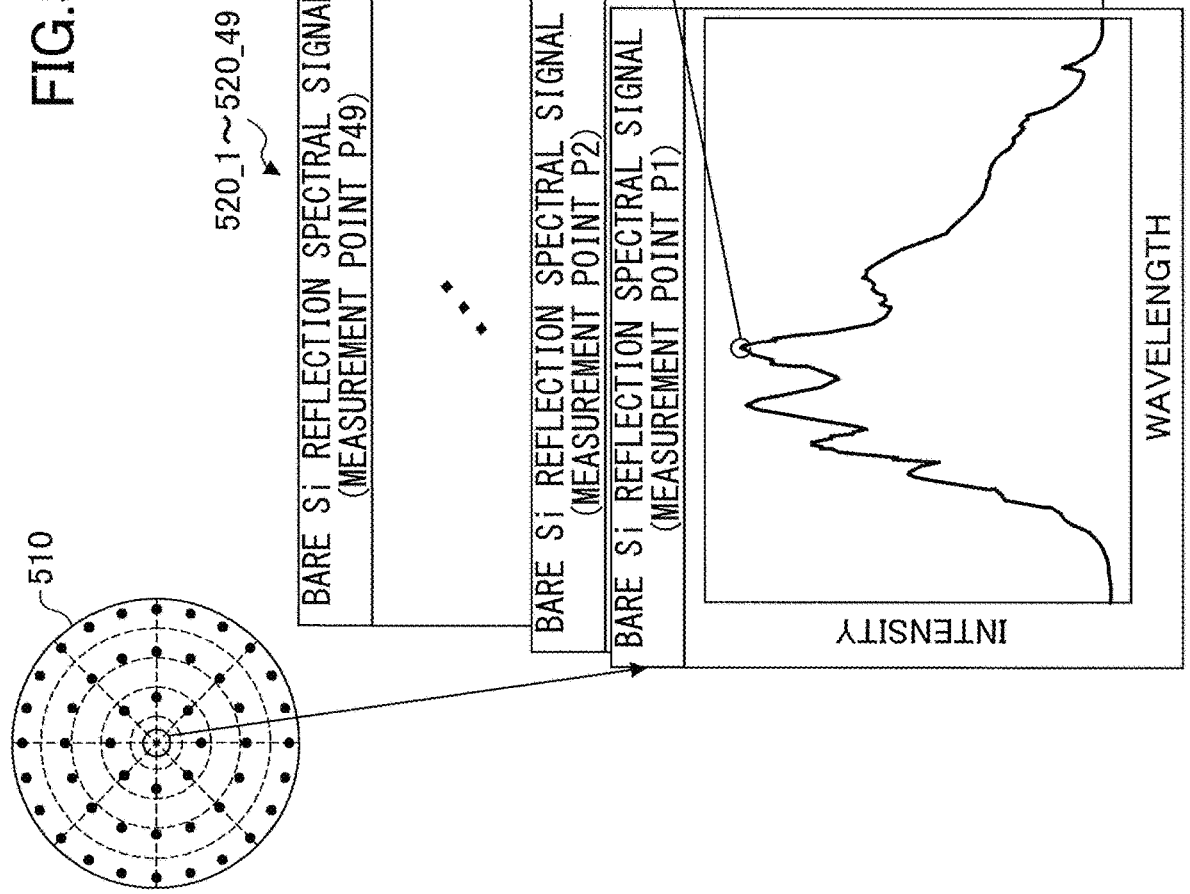
FIG. 5 is a diagram illustrating a specific example of a process of a spectral distribution acquiring unit in a calibration phase.

(1) Example of the Process of the Spectral Distribution Acquiring Unit in the Calibration Phase First, a specific example of the process of the spectral distribution acquiring unit 301 in the calibration phase will be described. FIG. 5 is a diagram illustrating the specific example of the process of the reflection spectral distribution acquiring unit in the calibration phase.

In FIG. 5, the symbol 510 illustrates the front (top) view of a reference wafer (bare Si wafer) placed on the wafer chuck head 170. In the symbol 510, points arranged concentrically indicate locations on the bare Si wafers, at which reflected light is detected by the collection probe 120. Among each of the locations of the bare Si wafer, the central location on the bare Si wafer is the reference location.

In the example of FIG. 5, the collection probe 120 detects reflected light with respect to each of 49 locations. Here, the 49 locations are referred to as measurement points P1 to P49, respectively. It should be noted that the number of locations at which the collection probe 120 detects reflected light is not limited to 49. Also, the arrangement of locations at which the collection probe 120 detects reflected light is not limited to concentric.

As illustrated in FIG. 5, by the collection probe 120 detecting reflected light, the spectral distribution acquiring unit 301 acquires bare Si reflection spectral signals 520_1 to 520_49 at the respective measurement points P1 to P49.

Also, as illustrated in FIG. 5, the spectral distribution acquiring unit 301 extracts a peak value of each of the bare Si reflection spectral signals 520_1 to 520_49, from the bare Si reflection spectral signals 520_1 to 520_49 at the respective measurement points P1 to P49. The spectral distribution acquiring unit 301 calculates relative reflectances, each of which are a relative value to the peak value extracted from the bare Si reflection spectral signal at the reference location (measurement point P1) and generates data D1.

As illustrated in FIG. 5, as items of information, data D1 includes "MEASUREMENT POINT", "PEAK VALUE OF BARE Si REFLECTANCE", and "BARE Si RELATIVE REFLECTANCE (K)". The column "MEASUREMENT POINT" stores information indicating each location at which reflected light is detected. The column "PEAK VALUE OF BARE Si REFLECTANCE" stores the peak value extracted from the bare Si reflection spectral signal of the reflected light detected at the corresponding measurement point. Furthermore, the column "BARE Si RELATIVE REFLECTANCE (K)" stores the relative reflectance of the peak value extracted from the bare Si reflection spectral signal of the reflected light detected at the corresponding measurement point, with respect to the peak value extracted from the bare Si reflection spectral signal 520_1.

Figure 6:
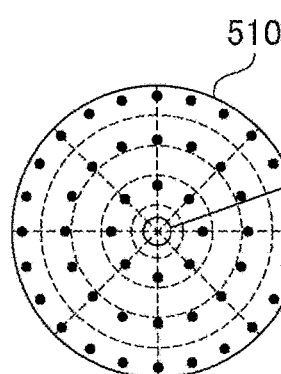
FIG. 6 is a diagram illustrating a specific example of a process of a distance distribution acquiring unit in the calibration phase.

(2) Example of the Process of the Distance Distribution Acquiring Unit in the Calibration Phase Next, a specific example of the process of the distance distribution acquiring unit 302 in the calibration phase will be described. FIG. 6 is a diagram illustrating the specific example of the process of the distance distribution acquiring unit in the calibration phase.

In FIG. 6, the symbol 510 illustrates the front (top) view of a reference wafer (bare Si wafer) placed on the wafer chuck head 170. Points arranged concentrically indicate locations on the bare Si wafer at which distance data indicating a distance to the collection probe 120 is measured by the distance sensor 130.

In the example of FIG. 6, at each of 49 locations, the distance sensor 130 measures distance data indicating the distance to the collection probe 120. It should be noted that the number of locations at which the distance sensor 130 measures the distance is not limited to 49. Also, the arrangement of each location at which the distance sensor 130 measures distance data is not limited to concentric.

However, the number and arrangement of the locations are assumed to be the same as the number and arrangement of locations at which the collection probe 120 detects reflected light.

As illustrated in FIG. 6, by the distance sensor 130 measuring distance data, the distance distribution acquiring unit 302 acquires the distance data between the collection probe 120 and the respective locations of the measurement points P1 to P49, and generates data D2. As illustrated in FIG. 6, the data D2 includes, as items of information, "MEASUREMENT POINT" and "BARE Si DISTANCE DATA (G)". The column "MEASUREMENT POINT" stores information indicating each location at which distance data is measured. The column "BARE Si DISTANCE DATA (G)" stores distance data measured at the corresponding measurement point.

Figure 7:
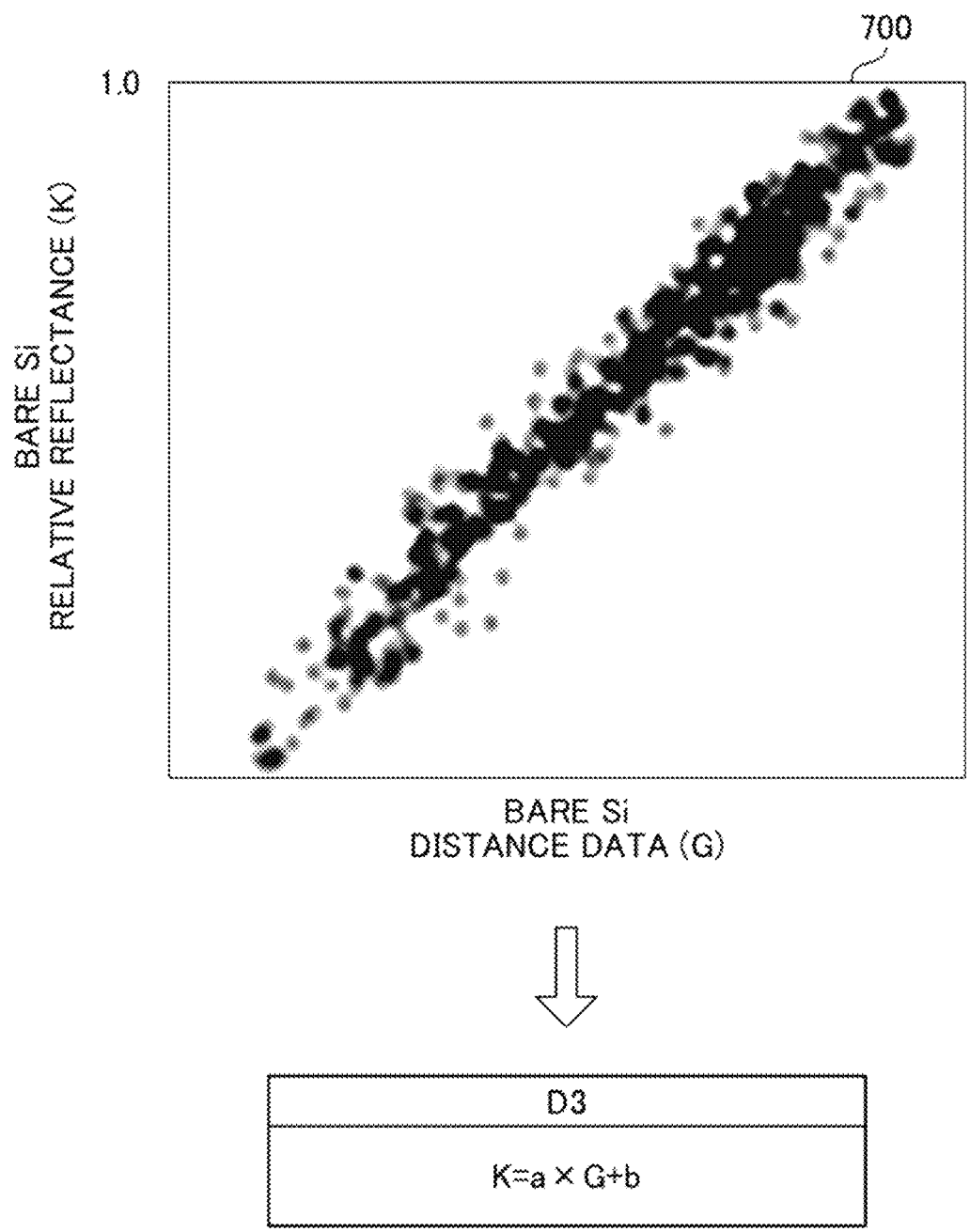
FIG. 7 is a diagram illustrating a specific example of a process of a relationship computing unit in the calibration phase.

(3) Example of the Process of the Relationship Computing Unit During the Calibration Phase Next, a specific example of the process of the relationship computing unit 303 in the calibration phase will be described. FIG. 7 is a diagram illustrating the specific example of the process of the relationship computing unit in the calibration phase.

In the graph 700 of FIG. 7, the horizontal axis indicates bare Si distance data (G) acquired by the distance distribution acquiring unit 302, and the vertical axis indicates bare Si relative reflectance (K) acquired by the spectral distribution acquiring unit 301.

As illustrated in FIG. 7, the relationship computing unit 303 acquires the data D1 and the data D2, and plots markers at locations corresponding to sets of bare Si distance data (G) and bare Si relative reflectance (K) measured at the respective measurement points P1 to P49. This produces graph 700.

Further, as illustrated in FIG. 7, the relationship computing unit 303 computes the linear equation representing the relationship between the bare Si distance data (G) and the bare Si relative reflectance (K) based on the generated graph 700. As illustrated in FIG. 7, the relationship between bare Si distance data (G) and bare Si relative reflectance (K) can be approximated by the linear equation $K=a \times G+b$ (where a and b are coefficients). The relationship computing unit 303 notifies the parameter computing unit 304 of the approximate primary expression as the data D3.

Figure 8:
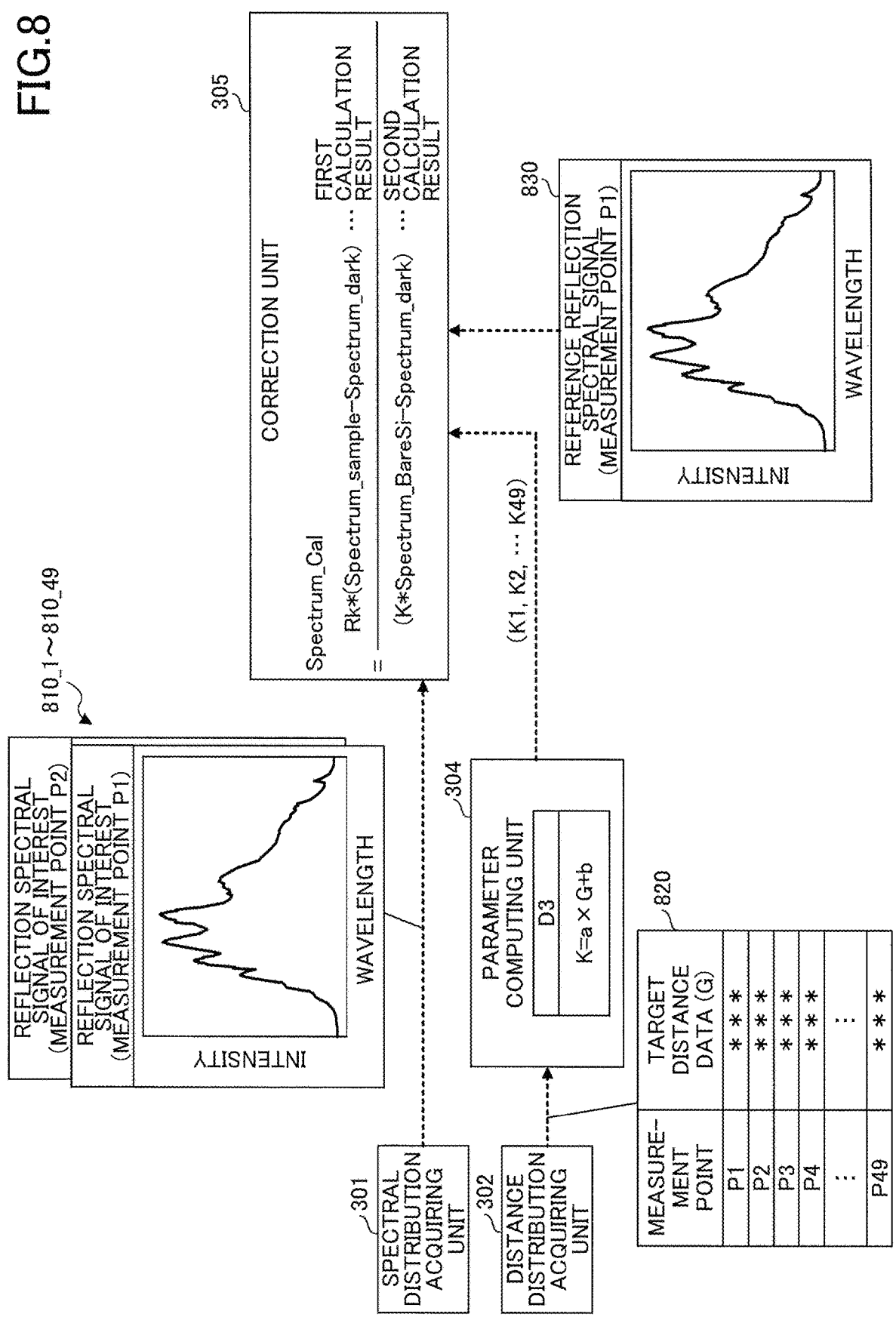
FIG. 8 is a diagram illustrating a specific example of a process of each component during a measurement phase.

Example of Processing of Each Component in the Reflection Spectrum Correcting Section During the Measurement Phase Next, a specific example of the process of each component in the reflection spectrum correcting section 150 during the measurement phase will, be described. FIG. 8 is a diagram illustrating the specific example of the process of each of the components during the measurement phase.

As illustrated in FIG. 8, in the measurement phase, the spectral distribution acquiring unit 301 acquires reflection spectral signals of interest 810_1 to 810_49 of reflected light detected by the collection probe 120 at the respective measurement points P1 to P49 on a wafer to be measured. The spectral, distribution acquiring unit 301 notifies the correction unit 305 of the acquired reflection spectral signals of interest 810_1 to 810_49.

As illustrated in FIG. 8, in the measurement phase, the distance distribution acquiring unit 302 notifies the parameter computing unit 304 of the target distance data (G) between the collection probe 120 and each of the measurement points P1 to P49 of the wafer to be measured, which is measured by the distance sensor 130, as distance data 820.

As illustrated in FIG. 8, in the measurement phase, the parameter computing unit 304 inputs the target distance data (G) of the measurement points P1 to P49 of the distance data 820 to the linear equation: $K=x \times G+b$, which the data D3 indicates. Accordingly, the parameter computing unit 304 can output the relative reflectance (K1) to the relative reflectance (K49) for the respective input target distance data (G).

The correction unit 305 subtracts, from each of the reflection spectral signals of interest 810_1 to 810_49 detected at the respective measurement points P1 to P49 on the wafer to be measured, which are notified by the spectral distribution acquiring unit 301, an amount corresponding to the dark signal. Also, by multiplying results of the subtraction by the correction coefficient Rk of the absolute reflectance, a first calculation result is obtained. In the example of FIG. 8, the intensity of the reflection spectral signal of interest is denoted by "Spectrum_sample", and the intensity of the dark signal is denoted by "Spectrum_dark". The dark signal is a signal detected by the collection probe 120 when visible light is emitted from the light source 110.

The correction unit 305 multiplies the reference reflection spectral signal 830 at the reference location on the reference wafer (bare Si wafer) by the corresponding relative reflectance (K), and subtracts the dark signal, to obtain a second calculation result (corrected reference reflection spectral signal). In the example of FIG. 8, the intensity of the reference reflection spectral signal is denoted by "Spectrum_BareSi", and the intensity of the dark signal is denoted by "Spectrum_dark".

Further, the correction unit 305 divides the first calculation result by the second calculation result to obtain the result of comparison between the intensity of the reflection spectral signals 810_1 to 810_49 measured at the respective measurement points P1 to P49 and the intensity of the corresponding corrected reference reflection spectral signal. In the example of FIG. 8, the result of comparison is denoted by "Spectrum__Cal".

The correction unit 305 notifies the film thickness calculating section 160 of the intensity of the corrected reference reflection spectral signal ("K*Spectrum__BareSi") or the result of comparison ("Spectrum_Cal").

Calculation Result of Film Thickness

Figure 9:
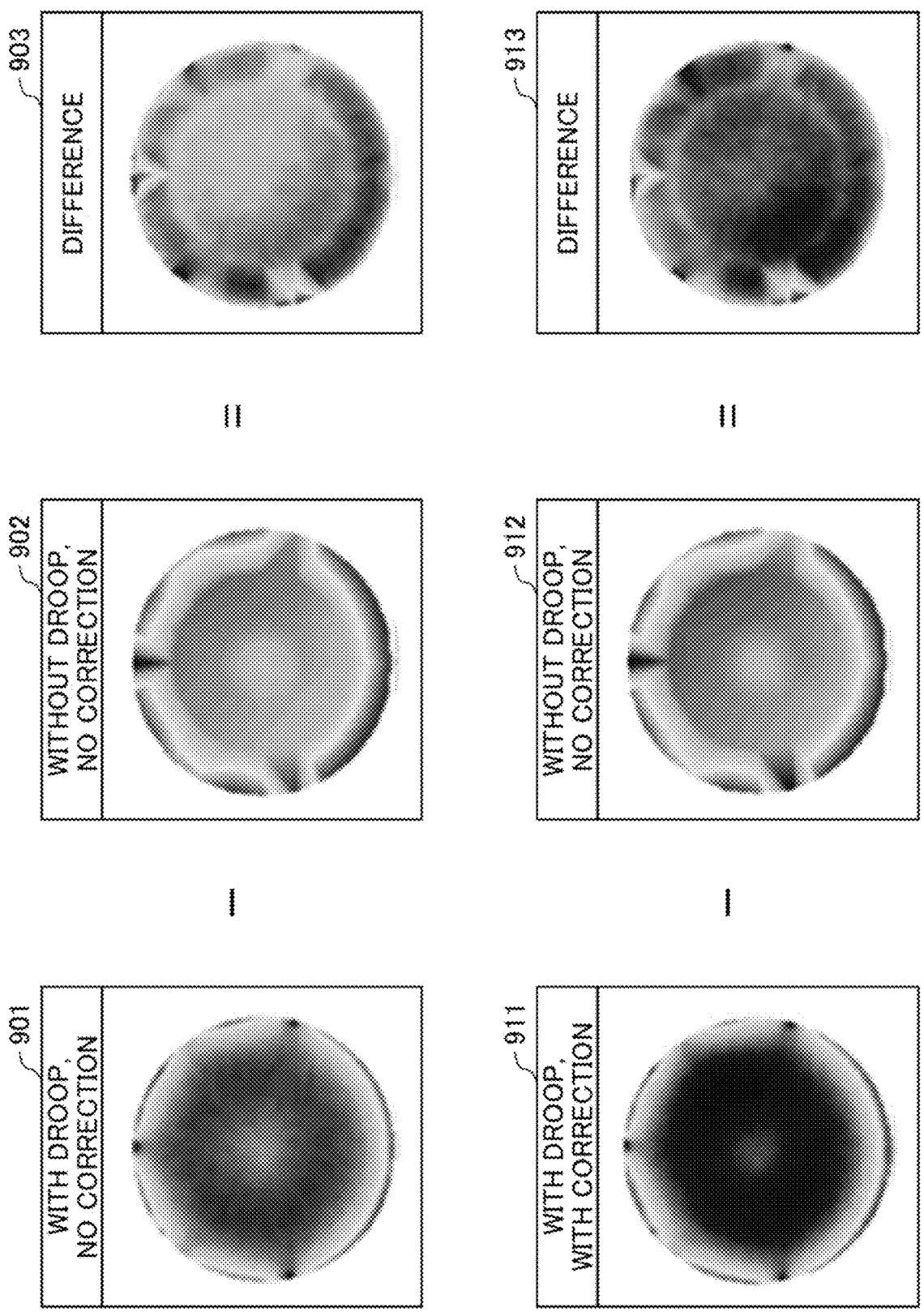
FIG. 9 is a set of diagrams illustrating an improvement in accuracy of film thickness measurement.

Next, effects of calculating the film thickness using the corrected reference reflection spectral signal will be described with reference to FIG. 9. FIG. 9 is a set of diagrams illustrating an improvement in accuracy of film thickness measurement, which illustrates results of measurement using general ellipsometry.

In FIG. 9, a film thickness measurement result 901 illustrates a result of calculating the film thickness by detecting reflected light from a wafer to be measured whose outer peripheral portion droops, and by comparing the reflection spectral signal of interest of the detected reflected light with the reference reflection spectral signal.

Meanwhile, in FIG. 9, the film thickness measurement result 902 illustrates a result of calculating the film thickness, by detecting reflected light from a wafer to be measured whose outer peripheral portion does not droop, and by comparing the reflection spectral signal of interest of the detected reflected light with the reference reflection spectral signal. The film thickness measurement result 902 is obtained by keeping the wafer to be measured free of bending or drooping.

Further, in FIG. 9, the difference distribution 903 illustrates the difference (error in the film thickness measurement) between the film thickness measurement result 901 and the film thickness measurement result 902. Specifically, in FIG. 9, darker color indicates that the difference is smaller, and lighter color indicates that the difference is larger. In the case of the difference distribution 903, the effect of the drooping of the outer peripheral portion of the wafer to be measured is seen as the error in the film thickness measurement (the difference is large).

Meanwhile, in FIG. 9, the film thickness measurement result 911 illustrates a result of calculating the thickness, by detecting reflected light from a wafer to be measured whose outer peripheral portion droops, and by comparing the reflection spectral signal of interest of the detected reflected light with the corrected reference reflection spectral signal.

In FIG. 9, the film thickness measurement result 912 illustrates a result of calculating the film thickness, by detecting reflected light from a wafer to be measured whose outer peripheral portion does not droop, and by comparing the reflection spectral signal of interest of the detected reflected light with the reference reflection spectral signal.

Further, in FIG. 9, the difference distribution 913 illustrates the difference (error in the film thickness measurement) between the film thickness measurement result 911 and the film thickness measurement result 912. Specifically, in FIG. 9, darker color indicates that the difference is smaller, and lighter color indicates that the difference is larger. In the case of the difference distribution 913, the effect of the drooping of the outer peripheral portion of the wafer to be measured is eliminated, and the difference is generally smaller (error in the film thickness measurement is smaller), as compared to the difference distribution 903.

As described above, by using the corrected reference reflection spectral signal when calculating the film thickness, the film thickness can be appropriately calculated even in a case in which the outer circumferential portion of a wafer to be measured droops, and thus a decrease in the measurement accuracy of the film thickness measurement can be avoided.

SUMMARY

As is obvious from the above description, the film thickness measurement device according to the first embodiment includes a reflection spectrum correcting section, and the reflection spectrum correcting section is configured to:
for each of the reflection spectral signals of reflected light at respective locations on a wafer having a known thickness other than the reference location that are detected by the collection probe, calculate a relative reflectance with respect to the reference reflection spectral, signal of reflected light at the reference location on the wafer having the known thickness detected by the collection probe;
specify the relationship between the relative reflectance and distance data representing the distance between the locations on the reference wafer and the collection probe, to calculate a linear equation;
for each distance data representing a distance between each location on a wafer to be measured and the collection probe, a relative reflectance is calculated based on the linear equation; and
in calculating film thickness at each of the locations on the wafer to be measured, adjust the reference reflection spectral signal based on the relative reflectance of the corresponding location based on the linear equation.

Accordingly, in the film thickness measurement device according to the first embodiment, even in a case in which a wafer to be measured is deformed, the film thickness can be calculated appropriately, and it is possible to avoid a decrease in the measurement accuracy of the film thickness measurement.

Second Embodiment

In the first embodiment described above, respective relative reflectances are calculated based on the peak values of the reflection spectral signals obtained in accordance with variation of distance data of 49 points due to bending or drooping of the reference wafer, and the relationship expression is calculated using the calculated relative reflectances.

However, a method of calculating the relationship expression is not limited thereto. For example, the method of calculating the relationship expression may be configured to predict a peak value of the reflection spectral signal corresponding to distance data outside the range of variation of the distance due to bending or drooping of the reference wafer, and to calculate the relationship expression using relative reflectances including the relative reflectance calculated based on the predicted peak value.

In the above-described first embodiment, reflected light is detected by using a deformed reference wafer. However, the method of detecting reflected light is not limited thereto, and may be configured to detect reflected light while varying the distance between the collection probe 120 and the reference wafer, for example. This increases the range of variation in distance data compared to the case of using a deformed reference wafer.

In the above-described first embodiment, the reference reflection spectral signal is prepared in advance in the calibration phase, and each time the distance data of each location on a wafer to be measured is measured in the measurement phase, the corresponding relative reflectance is calculated and multiplied by the reference reflection spectral signal. However, multiple corrected reference reflection spectral signals may be prepared during the calibration phase, by multiplying, for each distance data, the reference reflection spectral signal by a corresponding relative reflectance. In addition, during the measurement phase, each time the distance data is measured, the corresponding corrected reference reflection spectral signal may be read out.

In the above-described first embodiment, FIG. 8 illustrates a case in which the correction unit 305 notifies the film thickness calculating section 160 of a result of comparison between the reflection spectral signal of interest and the corrected reference reflection spectral signal. However, the correction unit 305 may be configured to notify the film thickness calculating section 160 of the corrected reference reflection spectral signal, and the film thickness calculating section 160 may be configured to compare the corrected reference reflection spectral signal with the reflection spectral signal of interest.

It should be noted that the present invention is not limited to the above-described configurations, such as the configurations described in the above-described embodiments, or configurations combined with other elements. Configurations may be changed to an extent not departing from the spirit of the invention, and can be appropriately determined in accordance with their application form.

This application is based on and claims priority to Japanese Patent Application No. 2013-122148, filed on Jun. 21, 2018, the entire contents of which are incorporated herein by reference.

DESCRIPTION OF SYMBOLS

100: Film thickness measurement device
110: Light Source
120: Collection probe
130: Distance sensor
140: Controller
150: Reflection spectrum correcting section
160: Film thickness calculating section
170: Wafer chuck head
301: Spectral distribution acquiring unit
302: Distance distribution acquiring unit
303: Relationship computing unit
304: Parameter computing unit
305: Correction unit

What is claimed is:

1. A film thickness measurement device comprising:
   a processor; and
   a memory storing a computer program that causes the processor to execute processes including
   a) calculating relative reflectances of respective reflection spectral signals of reflected light detected, by a collection probe, at respective locations on a first wafer having a known thickness other than a reference location on the first wafer, with respect to a reference reflection spectral signal of reflected light detected by the collection probe at the reference location on the first wafer;
   b) specifying a relationship between the relative reflectances calculated in a) and distance data representing distances between the respective locations on the first wafer and the collection probe;
   c) calculating relative reflectances each corresponding to distance data representing a distance between the collection probe and a corresponding location on a second wafer to be measured, based on the relationship specified in b); and
   d) calculating corrected reference reflection spectral signals by correcting the reference reflection spectral signal based on the relative reflectances calculated in c); and
   e) calculating film thicknesses at respective locations on the second wafer, based on the corrected reference reflection spectral signals calculated in d), an absolute reflectance of the first wafer, and reflection spectral signals of reflected light detected at the respective locations on the second wafer.

2. The film thickness measurement device according to claim 1, wherein in a), each of the relative reflectances is calculated, using a peak value extracted from the reference reflection spectral signal of the reflected light detected by the collection probe at the reference location on the first wafer, and using a peak value extracted from a reflection spectral signal of the reflected light detected by the collection probe at a corresponding location of the respective locations other than the reference location.

3. The film thickness measurement device according to claim 2, wherein in b), the relationship between the relative reflectances calculated in a) and the distance data representing the distances between the respective locations on the first wafer and the collection probe is approximated, by using a linear equation.

4. The film thickness measurement device according to claim 1, wherein d) includes
   calculating the corrected reference reflection spectral signals by multiplying the reference reflection spectral signal by the respective relative reflectances; and
   calculating a comparison result for each location on the second wafer, by comparing a reflection spectral signal of interest of reflected light detected by the collection probe at a corresponding location on the second wafer with a corresponding reference reflection spectral signal of the corrected reference reflection spectral signals; and
   wherein in e), the comparison result is used for calculating the film thicknesses at the respective locations of the second wafer.

5. The film thickness measurement device according to claim 1, further comprising a distance sensor configured to measure a distance between a desired point on a wafer and the collection probe; wherein
   the distance data representing the distance between the location on the first wafer and the collection probe and the distance data representing the distance between the collection probe and the corresponding location on the second wafer are measured by the distance sensor.

6. The film thickness measurement device according to claim 5, wherein detection of the reflected light by the collection probe and measurement of the distance by the distance sensor are performed simultaneously.

7. A correction method comprising:
   a) calculating relative reflectances of respective reflection spectral signals of reflected light detected, by a collection probe, at respective locations on a first wafer having a known thickness other than a reference location on the first wafer, with respect to a reference reflection spectral signal of reflected light detected by the collection probe at the reference location on the first wafer;
   b) specifying a relationship between the relative reflectances calculated in a) and distance data representing distances between the respective locations on the first wafer and the collection probe;
   c) calculating relative reflectances each corresponding to distance data representing a distance between the collection probe and a corresponding location on a second wafer to be measured, based on the relationship specified in b);
   d) calculating corrected reference reflection spectral signals by correcting the reference reflection spectral signal based on the relative reflectances calculated in c); and
   e) calculating film thicknesses at respective locations on the second wafer, based on the corrected reference reflection spectral signals calculated in d), an absolute reflectance of the first wafer, and reflection spectral signals of reflected light detected at the respective locations on the second wafer.

\* \* \* \* \*